United States Patent
Weaver et al.

(10) Patent No.: US 8,267,175 B2
(45) Date of Patent: Sep. 18, 2012

(54) METHOD FOR WELLBORE SERVICING TO ENHANCE THE MECHANICAL STRENGTH OF CEMENT USING ELECTROCHEMICALLY ACTIVATED WATER

(75) Inventors: Jim Weaver, Duncan, OK (US); Mark Savery, Duncan, OK (US); Billy Slabaugh, Duncan, OK (US); Roger Cromwell, Walters, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 294 days.

(21) Appl. No.: 12/440,910

(22) PCT Filed: Sep. 24, 2007

(86) PCT No.: PCT/US2007/079327
§ 371 (c)(1),
(2), (4) Date: Mar. 11, 2009

(87) PCT Pub. No.: WO2008/039727
PCT Pub. Date: Apr. 3, 2008

(65) Prior Publication Data
US 2009/0308612 A1 Dec. 17, 2009

Related U.S. Application Data

(60) Provisional application No. 60/826,804, filed on Sep. 25, 2006.

(51) Int. Cl.
*E21B 33/13* (2006.01)
*C09K 8/42* (2006.01)

(52) U.S. Cl. .................. 166/292; 166/305.1
(58) Field of Classification Search ............ 175/65; 166/305.1, 308.1, 285, 292, 293, 294
See application file for complete search history.

(56) References Cited

U.S. PATENT DOCUMENTS

| | | | | |
|---|---|---|---|---|
| 2,497,398 | A | * | 2/1950 | Dawson .................... 507/138 |
| 2,557,647 | A | * | 6/1951 | Gates et al. ............... 507/137 |
| 2,801,697 | A | * | 8/1957 | Rohrback ................. 166/244.1 |
| 4,527,626 | A | * | 7/1985 | Cantu et al. ............... 166/275 |
| 4,690,180 | A | | 9/1987 | Gold |
| 5,346,012 | A | | 9/1994 | Heathman et al. |
| 5,427,667 | A | | 6/1995 | Bakhir et al. |
| 5,588,488 | A | | 12/1996 | Vijn et al. |

(Continued)

FOREIGN PATENT DOCUMENTS

| JP | 2000141351 A | 5/2000 |
|---|---|---|
| RU | 2163582 C2 * | 2/2001 |

(Continued)

OTHER PUBLICATIONS

EcaFlo ® Division, http://www.ietusa.net/ecaflo.html, 2006, 1 page, Integrated Environmental Technologies, Inc.

(Continued)

*Primary Examiner* — Shane Bomar
*Assistant Examiner* — Catherine Loikith
(74) *Attorney, Agent, or Firm* — Craig W. Roddy; Conley Rose, P.C.

(57) ABSTRACT

A wellbore servicing method comprises converting a water into an electrochemically activated water, preparing a wellbore servicing composition comprising the electrochemically activated water, and placing the wellbore servicing composition in a wellbore. Also, a cement composition comprises a cement and an electrochemically activated water.

20 Claims, 6 Drawing Sheets

U.S. PATENT DOCUMENTS

| | | | |
|---|---|---|---|
| 5,847,353 A | | 12/1998 | Titus et al. |
| 5,913,364 A | | 6/1999 | Sweatman |
| 5,985,110 A | | 11/1999 | Bakhir et al. |
| 6,018,471 A | | 1/2000 | Titus et al. |
| 6,018,542 A | | 1/2000 | Berger |
| 6,037,560 A | | 3/2000 | Titus et al. |
| 6,167,967 B1 | | 1/2001 | Sweatman |
| 6,215,678 B1 | | 4/2001 | Titus et al. |
| 6,258,757 B1 | | 7/2001 | Sweatman et al. |
| 6,630,113 B1 | | 10/2003 | Surma |
| 7,802,623 B2 | * | 9/2010 | Lunde et al. ............... 166/305.1 |
| 2009/0199866 A1 | * | 8/2009 | Kirkpatrick ...................... 134/3 |
| 2009/0301717 A1 | * | 12/2009 | Lunde et al. .................. 166/268 |

FOREIGN PATENT DOCUMENTS

| | | | |
|---|---|---|---|
| SU | 1134699 A | * | 1/1985 |
| WO | 2008039727 A2 | | 4/2008 |
| WO | 2008039727 A3 | | 4/2008 |

OTHER PUBLICATIONS

EcaFlo ® Research, http://www.ietusa.net/ecafloresearch.html, 2006, 1 page, Integrated Environmental Technologies, Inc.

EcaFlo ® Technology, http://www.ietusa.net/ecaflotechnology.html, 2006, 2 pages, Integrated Environmental Technologies, Inc.

Foreign communication from a related counterpart application—International Preliminary Report on Patentability, PCT/US2007/079327, Mar. 31, 2009, 5 pages.

Foreign communication from a related counterpart application—International Search Report and Written Opinion, PCT/US07/79327, Apr. 11, 2008, 5 pages.

Provisional patent application entitled "Method to enhance the mechanical strength of oil well cement using electrochemically activated water," by Jim Weaver, et al., filed Sep. 25, 2006 as U.S. Appl. No. 60/826,804.

Robinson, Vivian, "Electroflocculation in the treatment of polluted water," Joint NSW and Victoria State Conference, Nov. 22-24, 1999, pp. 1-9, Australian Water & Watewater Association.

Patent Application entitled "Method for wellbore servicing to enhance the mechanical strength of cement using electrochemically activated water," by Jim Weaver, et al., filed Apr. 24, 2012 as U.S. Appl. No. 13/454,866.

* cited by examiner

METHOD FOR WELLBORE SERVICING TO ENHANCE THE MECHANICAL STRENGTH OF CEMENT USING ELECTROCHEMICALLY ACTIVATED WATER

CROSS-REFERENCE TO RELATED APPLICATIONS

This application is a filing under 35 U.S.C. §371 of International Application No. PCT/US2007/079327 filed on Sep. 24, 2007 and entitled "Method for Wellbore Servicing to Enhance the Mechanical Strength of Cement Using Electrochemically Activated Water," which claims priority to U.S. Provisional Application Ser. No. 60/826,804, filed on Sep. 25, 2006 and entitled "Method to Enhance the Mechanical Strength of Oil Well Cement Using Electrochemically Activated Water," both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

This disclosure relates to a method and system for servicing a wellbore and preparing an improved cement. More specifically, this disclosure relates to a method and system for servicing a wellbore with cement compositions comprising electrochemically activated water.

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g. casing, is run in the wellbore. The drilling fluid may then be circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed. Secondary operations may include remedial cementing, squeeze cementing, plug-to-abandon cementing, or kick-off plug cementing.

A particular challenge in cementing is the development of satisfactory mechanical properties in a cement slurry within a reasonable time period. During the life of a well, the subterranean cement sheath undergoes numerous strains and stresses as a result of temperature effects, pressure effects, and impact effects. The ability to withstand these strains and stresses is directly related to the mechanical properties of the cement. The mechanical properties of a cement are often characterized using parameters such as compressive strength, tensile strength, Young's Modulus, Poisson's Ratio, elasticity, and the like. These properties may be modified by the inclusion of additives. For example, chemical accelerators such as sodium chloride may be added to cement slurries to obtain rapid setting of the cement and the development of compressive strength, while strength-enhancing additives such as silica flour can be used to ensure adequate compressive strength and long-term structural integrity of the cement. In some instances, fibers may be included to enhance the tensile strength of the set cement. In still other instances, polymeric elastomers may be included to enhance the elastic properties (often described by Young's Modulus and Poisson's Ratio) of the set cement. However, there are often drawbacks to the inclusion of such additives to the cement slurries. For example, the addition of an excessive amount of accelerator has resulted in cement slurries that stay in liquid form and never gain any compressive strength. In the case of the addition of fibers or elastomers to the cement slurry, these additives may rapidly form viscous gels with a premature loss of pumpability. In other cases, these additives may impart an undesired impact on cement slurry density. For example, the addition of polymeric elastomers may drastically reduce the overall cement slurry density and make it difficult to achieve a target density. Thus, a need exists for cement compositions with enhanced mechanical properties that maintain desirable features such as rheology (i.e. how a fluid responds to stresses and strains), pumpability, viscosity, setting time, density, and other features desirable to those skilled in the art.

SUMMARY

In one aspect, the disclosure includes a wellbore servicing method comprising converting a water into an electrochemically activated water, preparing a wellbore servicing composition comprising the electrochemically activated water, and placing the wellbore servicing composition in a wellbore.

In another aspect, the disclosure includes a cement composition comprising a cement and an electrochemically activated water.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a system and method for enhancing the mechanical properties of a wellbore servicing composition, such as a wellbore cement, using electrochemically activated water. Specifically, the wellbore servicing composition may be prepared using electrochemically activated water, which may improve the physical properties of the wellbore servicing composition. For example, the electrochemically activated water may increase the mechanical strength of a cement composition that has been placed in the wellbore and allowed to set. The wellbore servicing composition containing the electrochemically activated water may be used in any wellbore servicing operation, e.g. in primary or secondary cementing operations. The remainder of the disclosure relates primarily (and in a non-limiting manner) to cement compositions, and in particular wellbore cement compositions and methods of using same, provided however that other uses of such cement compositions as well as other wellbore servicing compositions comprising electrochemically activated water are contemplated by the disclosure herein.

Figure 1:
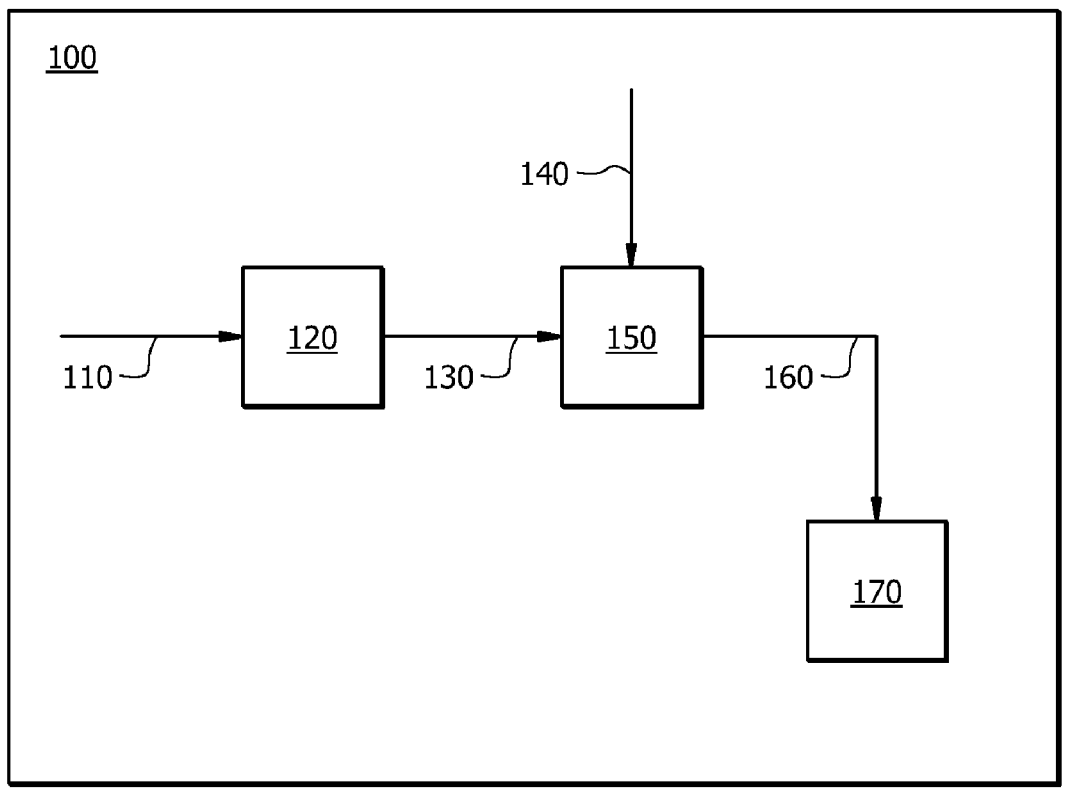
FIG. 1 is a schematic view of one embodiment of the cement preparation system.

In an embodiment, a method of preparing a cement composition comprises converting water into an electrochemically activated water and contacting a cement with the electrochemically activated water. The electrochemically activated water may be prepared by any means known to one of ordinary skill in the art. For example and referring to FIG. 1, a system 100 for preparing the electrochemically activated water may comprise an electrolytic cell 120 that is in fluid communication with a mixer 150 that is also in fluid communication with a wellhead 170. Water may be fed to the electrolytic cell 120 via flowline 110 and converted by the electrolytic cell 120 to an electrochemically activated water. The electrochemically activated water may be fed to the mixer 150 via flowline 130, while a cement may be fed to the mixer 150 via flowline 140. Optionally, one or more additives may be added to the cement, for example by being combined with the cement in flowline 140 or via a separate flowline into the mixer 150. The mixer 150 may then mix the electrochemically activated water, the cement, and the optionally additives to form the cement composition (e.g., a cement slurry). The cement composition may then be sent to the wellhead 170 via flowline 160 and injected downhole. The system 100 may comprise additional devices such as heaters, coolers, pumps, temperature/pressure controls, valves, and the like as needed.

In an embodiment, the water is introduced to the electrolytic cell 120. The water may be from a storage tank and or other sources and, if desired, may be pretreated to a certain condition (i.e. temperature, pressure, etc) before the water is fed to the electrolytic cell 120. The water may comprise water molecules, ions, salts, insoluble particles, swellable particulates, inert particulates, solvents partially or completely dissolved in the water, or other soluble particles partially or completely dissolved in the water. Examples of suitable water include potable water, natural water, salt water, contaminated water, clean water, filtered water, or combinations thereof.

The water may be converted into the electrochemically activated water by the electrolytic cell 120 using an electrolytical modification or an electrochemical activation. Electrolytical modification uses an energy state change to separate a substance into its electrolytes, which may include a catholyte having negatively charged ions and an anolyte having positively charged ions. Such a conversion process is sometimes referred to as electrolysis. For example, an electrical current may be used to separate the water into hydronium cations ($H_3O^+$) and hydroxide anions ($OH^-$). In contrast, electrochemical activation uses a chemical reaction to separate a substance into its electrolytes. An example of such a process is a reduction/oxidation (redox) reaction. Redox reactions refer to any reaction whereby the water atoms have their oxidation number (oxidation state) changed. For example, when the water undergoes a redox reaction, hydronium ($H_3O^+$) or hydrogen groups ($H^+$) and alcohol groups ($OH^-$) are generated. The redox reaction may be initiated or stimulated by an electrical current, if desired.

In an embodiment, the electrochemically activated water is a catholyte generated by one of the processes described herein. The electrochemically activated water may act as an antioxidant in that it slows or prevents oxidation of other molecules, for example, by oxidizing itself. The electrochemically activated water may also have an alkaline potential of hydrogen (pH) and/or a negative ionic potential. In an embodiment, the electrochemically activated water is a mild alkaline solution with a pH from about 10 to about 12. In another embodiment, the water has an oxidation-reduction potential (ORP) of from about −600 mV to about −900 mV.

The water may be modified before the electrolytic cell 120 performs the electrochemical activation that modifies the functional properties of the water. In one embodiment, the electrolytic cell 120 combines the water with a weak saline solution and applies a current to the combined solution, which creates the electrochemically activated water. In some embodiments, the water already contains sufficient salts, thus the only required inlet to the machine is the water feed. Specifically, the electrolytic cell 120 uses naturally occurring molecules, ions, salts, particles, or other solvents partially or completely dissolved in the water, rather than adding such species to the water, to create the electrochemically activated water.

In one embodiment, the electrolytic cell 120 is a device capable of applying an electric field to the water to convert the water into electrochemically activated water. The water may be introduced into a chamber in the electrolytic cell 120 and a current is applied. When the current is applied, the molecules, ions, salts, particles, or other solvents partially or completely dissolved into the water and alter the properties of the water, e.g. through a redox reaction. Other electrolytic cell embodiments may include at least one electrolytic cell 120 containing a vertical element comprising a coaxial cylinder and rod electrodes made from materials that are non-soluble during electrolysis, and a ceramic diaphragm or filter installed between the electrodes to create interelectrode space in the electrode chambers. Channels may supply water into and discharge electrochemically activated water (i.e. catholyte) from the electrode chambers. A feeding line may be connected to the inlet of the negative electrode chamber, and the output of the negative electrode chamber may be connected to the inlet of the positive electrode chamber by a line containing a bypass that discharges a part of the degasified, treated solution from the negative electrode chamber. A catalyst chamber can be installed on such a line, and may contain a mixture of particles of carbon, sodium, manganese dioxide, citric acid, or combinations thereof. A separator with a tangential inlet may be used to discharge a part of the degasified processed solution. The electrolytic cell 120 transforms the molecular form of the water and transfers electrical energy to the water thereby creating the electrochemically activated water. This electrical energy transfer results in the creation of solutions whose properties include those that have been previously described. After the water leaves the electrochemical cell 120 via flowline 130, the water is fed to the mixer 150.

Specific examples of electrolytic cells 120 may be found in U.S. Pat. No. 5,427,667 entitled "Apparatus for Electrochemical Treatment of Water," and U.S. Pat. No. 5,985,110 entitled "Apparatus for Electrochemical Treatment of Water and/or Water Solutions," both of which are hereby incorporated by reference as if reproduced in their entirety. Alternatively, the electrolytic cell is an EcoFlo® Model 40 electrolytic cell, which is commercially available from Integrated Environmental Technologies, Ltd of Greensboro, N.C.

The cement is fed to the mixer 150 via flowline 140. The cement may be a hydraulic cement comprising calcium, aluminum, silicon, oxygen, and/or sulfur. Examples of suitable cement include Portland cements (e.g., classes A, C, G, and H Portland cements), construction cements (e.g. type I and II), pozzolana cements, gypsum cements, shale cements, acid/base cements, phosphate cements, high alumina content cements, silica cements, high alkalinity cements, magnesia cements, or combinations thereof.

Additives may be added to the cement to change and tailor the properties of cement according to the need of the user before the cement is fed to the mixer 150. Alternatively, the additives may be fed to the mixer 150 via a separate flowline (not shown). Examples of such additives include salts, accelerants, set retarders, foamers (i.e. nitrogen injection or air injection), defoamers, fluid loss agents, weighting materials, dispersants, vitrified shale, density-reducing additives (i.e. hollow glass beads, foam, etc), formation conditioning agents, lost circulation materials, thixotropic agents, suspension aids, mechanical property modifying additives (i.e. carbon fibers, glass fibers, metal fibers, minerals fibers, polymeric elastomers, latexes, etc), expanding additives from a chemical reaction or physical mechanism (i.e. in-situ hydrogen gas production), gas, fluid absorbing materials, resins, aqueous superabsorbers, non-aqueous superabsorbers, viscosifying agents, suspending agents, dispersing agents, inert particulates, or combinations thereof. Methods for introducing these additives and their effective amounts are known to one of ordinary skill in the art.

In an embodiment, the mixer 150 mixes the electrochemically activated water, the cement, and the additives to prepare a cement composition (e.g., slurry) comprising electrochemically activated water. Hereinafter, the cement comprising electrochemically activated water will be referred to as electrochemically activated water-containing cement (EAWC). In an embodiment, the components of the EAWC are combined at the wellsite. Alternatively, the components of the EAWC are combined off-site transported to the wellsite, and then used at the wellsite.

After leaving the mixer 150, the EAWC may be sent to the wellhead 170 via flowline 160. The wellhead 170 directs the EAWC downhole into the wellbore. If desired, the additives described previously may be added to the EAWC and pumped into the wellbore. After the EAWC is placed in a desired space, the EAWC may be set to generate a hardened EAWC.

The EAWC may have superior physical properties compared with similar cements lacking the electrochemically activated water. For example, the hardened EAWC disclosed herein has an enhanced compressive strength when compared to an otherwise identical hardened EAWC lacking the electrochemically activated water. Herein, the compressive strength is defined as the capacity of a material to withstand axially directed pushing forces. The maximum resistance of a material to an axial force is determined in accordance with API Recommended Practices 10B, Twenty-Second Edition, December 1997. Beyond the limit of the compressive strength, the material becomes irreversibly deformed and no longer provides structural support and/or zonal isolation. The compressive strength a cement formation attains is a function of cement type, water content, functionality of additives, the cement maturity (or cure time), the temperature at which setting occurs, and the pressure at which the setting occurs. The cement maturity specifically refers to the time the cement formulation is allowed to set. In an embodiment, the hardened EAWC disclosed herein may exhibit an increase in compressive strength from about 10% to about 330%, from about 50% to about 250%, or from about 100% to about 150% when compared to an otherwise identical hardened EAWC lacking the electrochemically activated water.

The hardened EAWC may have a density from about 4 pounds per gallon (ppg) to about 23 ppg, from about 6 ppg to about 17 ppg, or from about 12 ppg to about 14 ppg. Density reducing additives such as hollow glass beads or foam and expanding additives such as gas and the like may be included in the EAWC to generate a lightweight EAWC where strength may be limited to lightweight components in the EAWC. Persons of ordinary skill in the art are aware of various lightweight cementing applications. Amounts of such density-reducing additives and methods for their inclusion are known to one of ordinary skill in the art.

The EAWC may be introduced to the wellbore to prevent the loss of aqueous or non-aqueous drilling fluids into loss-circulation zones such as voids, vugular zones, and natural or induced fractures while drilling. In an embodiment, the EAWC is placed into a wellbore as a single stream and activated by downhole conditions to form a barrier that substantially seals loss circulation zones. In such an embodiment, the EAWC may be placed down hole through the drill bit forming a composition that substantially eliminates the lost circulation. Methods for introducing compositions into a wellbore to seal subterranean zones are described in U.S. Pat. Nos. 5,913, 364; 6,167,967; and 6,258,757, each of which is incorporated by reference herein in its entirety.

In an embodiment, the EAWC may be employed in well completion operations such as primary cementing and remedial cementing operations. The EAWC may be placed into an annulus of the wellbore and allowed to set such that it isolates the subterranean formation from a different portion of the wellbore. The EAWC may be placed in the annulus via the conventional method of pumping the EAWC first down the casing and then up the annulus. Alternatively, the EAWC may be placed via a "bull-heading" method in which the EAWC is pumped directly into the annulus. The EAWC thus forms a barrier that prevents fluids in that subterranean formation from migrating into other subterranean formations. Within the annulus, the EAWC also serves to support a conduit, e.g., casing, in the wellbore. In an embodiment, the wellbore in which the EAWC is positioned belongs to a multilateral wellbore configuration. It is to be understood that a multilateral wellbore configuration includes at least two principal wellbores connected by one or more ancillary wellbores. In another embodiment, the EAWC is placed primarily inside the casing with some or no cement reaching the annulus.

In secondary cementing, one example being squeeze cementing, the EAWC may be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, and so forth. Various procedures that may be followed to use a sealant composition in a wellbore are described in U.S. Pat.

Nos. 5,346,012 and 5,588,488, which are incorporated by reference herein in their entirety.

To illustrate the inventive features disclosed herein, the present application describes a novel cement composition and its methods of use. However, the electrochemically activated water described herein may be used in any wellbore servicing composition not just cement. Such fluids may be used to drill, complete, work over, fracture, repair, or in any way prepare or modify a wellbore or formation for the recovery of materials residing in the formation. It is to be understood that the wellbore or formation encompasses both areas below exposed earth and areas below earth covered by water such as ocean or fresh water. Examples of suitable wellbore servicing fluids include cement slurries, drilling fluids or muds, spacer fluids, fracturing fluids, workover fluids, or completion fluids, all of which are well known in the art.

Figure 2:
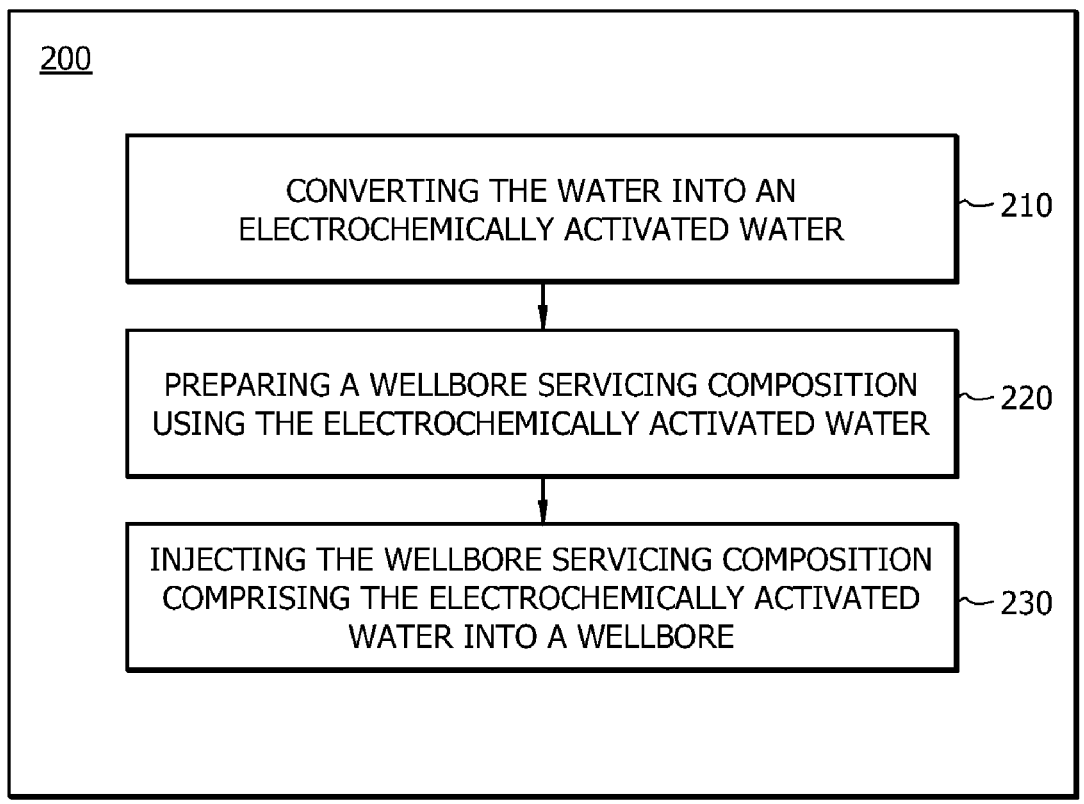
FIG. 2 is a flowchart of one embodiment of a process of mixing cement with electrochemically activated water to create cement composition comprising electrochemically activated water.

FIG. 2 is a flowchart of one embodiment of a method 200 for preparing a wellbore servicing composition. The method 200 may begin by converting the water into an electrochemically activated water at 210. Such conversion may include the electrolytical modification and/or the electrochemical activation described above, and may occur in the electrolytic cell 120 described above. In addition, the method 200 may include preparing a wellbore servicing composition comprising the electrochemically activated water at 220. The wellbore servicing composition may be the EAWC described above or any other wellbore servicing composition described herein. The wellbore servicing composition may be prepared in the mixer 150 described above. Finally, the wellbore servicing composition comprising the electrochemically activated water may be injected into a wellbore at 230. Such injection may be facilitated by one or more pumps, if desired.

While, the EAWC disclosed herein is described in the context of the wellbore servicing, it is explicitly understood that the EAWC may be used in any environment or application. For example, the EAWC may be used as a construction material, such as masonry construction, brick building, reinforced concentrate formation, prefabricated concrete structures, and the like. As such, the novel concepts described herein should only be limited by the appended claims.

EXAMPLES

The disclosure having been generally described, the following examples are given as particular embodiments of the disclosure and to demonstrate the practice and advantages thereof. It is understood that the examples are given by way of illustration and are not intended to limit the specification of the claims in any manner.

Example 1

Three slurries comprising class H cements were prepared with water obtained from different sources and cured at room temperature. Sample 1 was obtained by preparing the cement slurry with the catholyte described, Sample 2 was obtained by preparing the cement slurry with Duncan tap water (DTW) from the tap at Halliburton's Technology Center in Duncan, Okla., and Sample 3 was obtained by preparing the cement slurry with a caustic solution made up of a mixture of sodium hydroxide (NaOH) with a pH of 12.0. The compressive crush strength measured in pounds per square inch (psi) was measured after 24, 48, 72, and 168 hours after mixing. The device used was a Tinius-Olsen machine in accordance with American Petroleum Institute (API) testing standards for compressive strength. Table 1 shows the compressive strength of slurries comprising the catholyte, DTW or caustic solution, and the percentage increase of strength of the catholyte over DTW or caustic solution.

TABLE 1

| Time (hours) | Sample 1- Catholyte* | Sample 2 DTW | Sample 3 Caustic** | % Strength increase over DTW | % Strength increase over Caustic |
|---|---|---|---|---|---|
| 0 | 0 | 0 | 0 | — | — |
| 24 | 785 | 476 | 664 | 65 | 18 |
| 48 | 1489 | 1131 | 1173 | 25 | 20 |
| 72 | 2890 | 1958 | 1372 | 48 | 111 |
| 168 | 3880 | 2900 | 2710 | 34 | 43 |

*The catholyte had a pH of 11.86
**The caustic water contained NaOH and had a pH of 12.0

Figure 3:
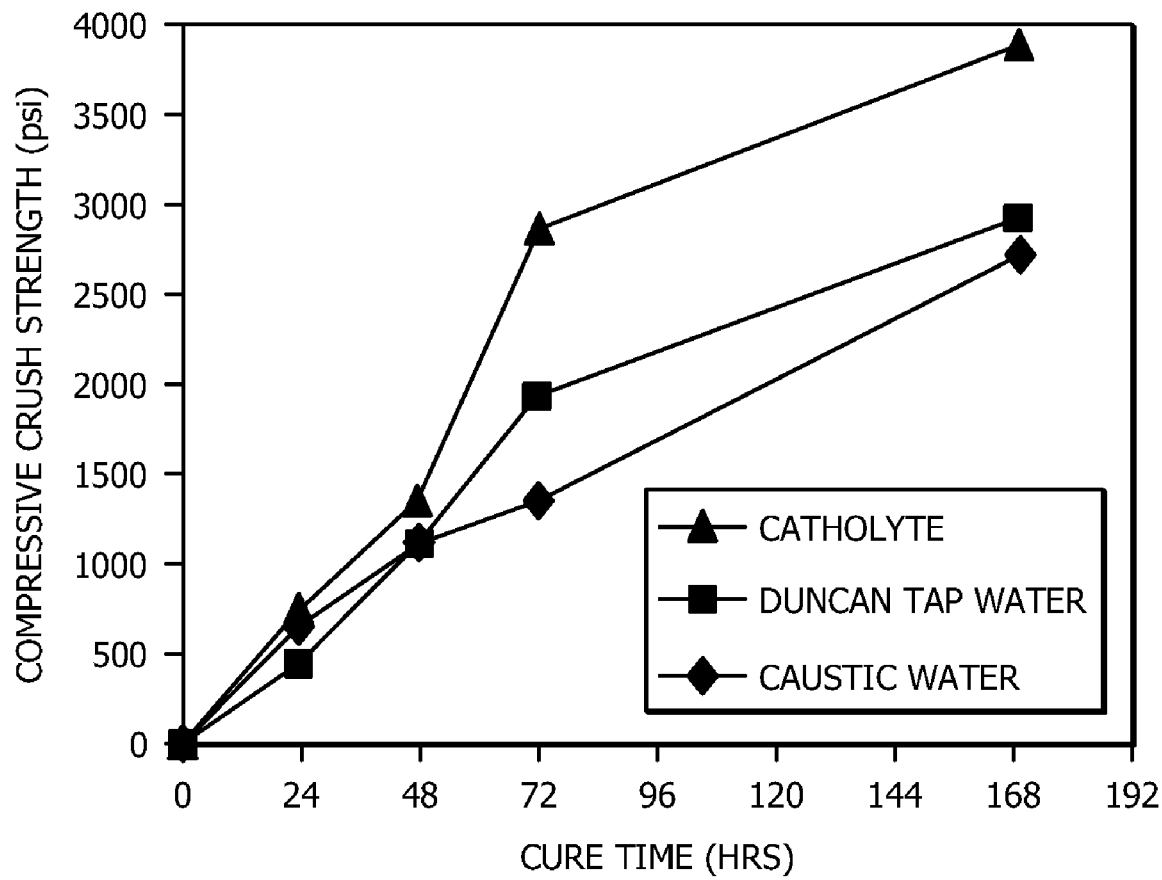
FIG. 3 is a plot of compressive strength as a function of cure time for a Class H oilwell cement slurry cured at room temperature.

These results are also plotted in FIG. 3. The results demonstrate an improvement in compressive strength after curing at room temperature is obtained with the use of the catholyte to form the cement slurries when compared to slurries formed using either DTW or caustic water.

Example 2

Figure 4:
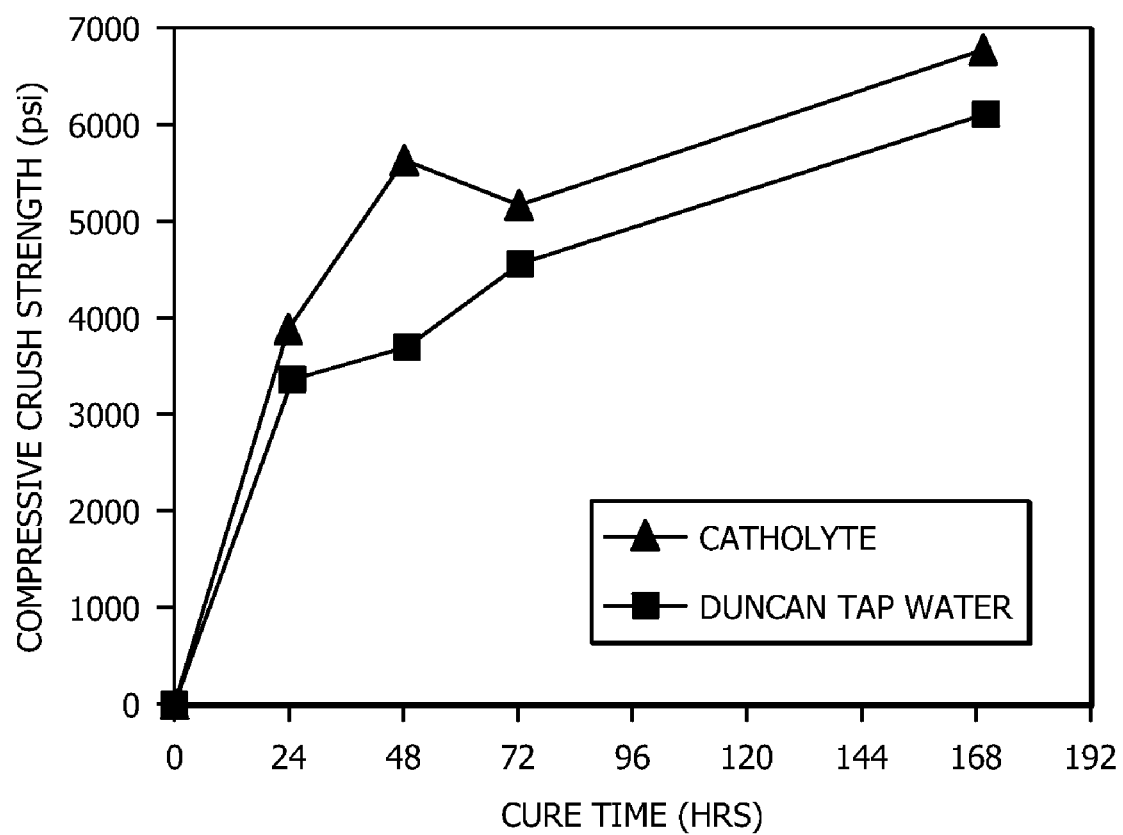
FIG. 4 is a plot of compressive strength as a function of cure time for a Class H oilwell cement slurry cured at 150° F.

Two slurries comprising a Class H cement and either DTW or catholyte were prepared and the compressive strength of the slurries evaluated after curing at 150° F. Sample 1 was obtained by preparing the cement slurry with catholyte, and Sample 2 was obtained by preparing the cement slurry with DTW. The compressive crush strength in psi was measured after 24, 48, 72, and 168 hours after mixing, and the percentage of strength increase is indicated. The results of this experiment are shown in Table 2 and FIG. 4.

TABLE 2

| Time (hours) | Sample 1- Catholyte | Sample 2- DTW | % Strength Increase |
|---|---|---|---|
| 0 | 0 | 0 | — |
| 24 | 3970 | 3380 | 17 |
| 48 | 5640 | 3720 | 52 |
| 72 | 5170 | 4590 | 13 |
| 168 | 6760 | 6060 | 12 |

The results demonstrate that Sample 1 comprising catholyte had an increased compressive strength after curing at 150° F. when compared to Sample 2 comprising DTW.

Example 3

Figure 5:
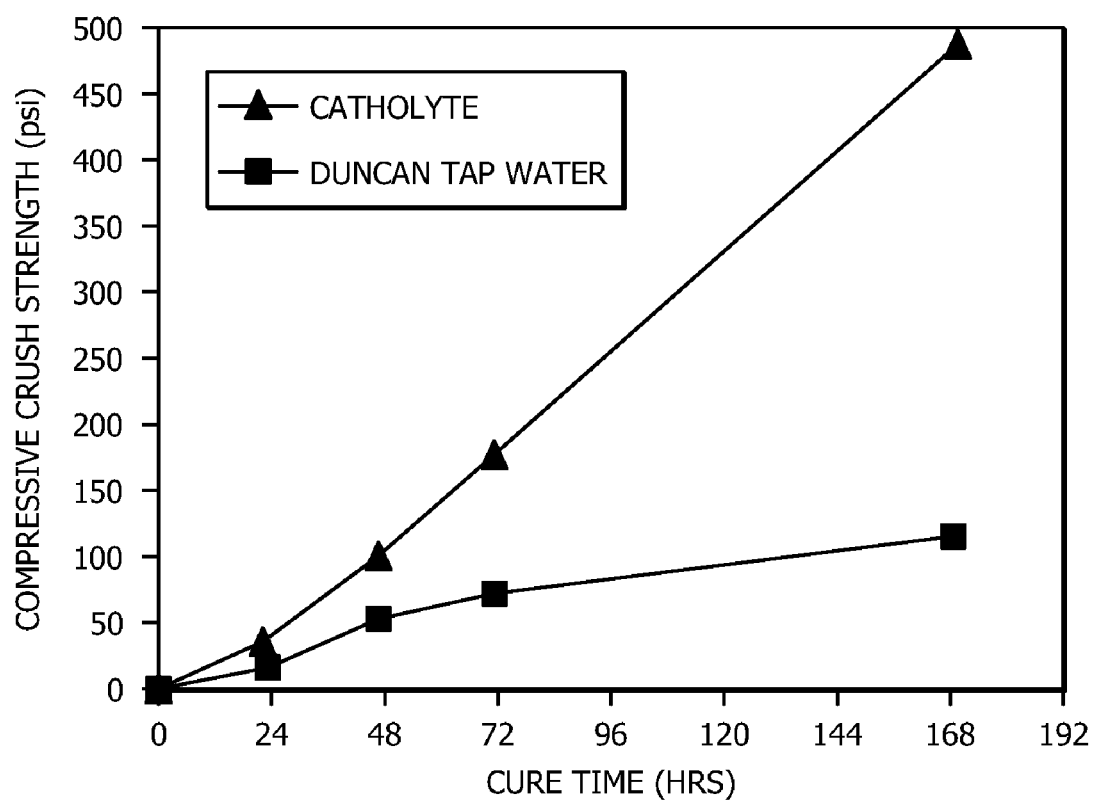
FIG. 5 is a plot of compressive strength as a function of cure time for a lightweight pozzolana cement slurry cured at room temperature.
Figure 6:
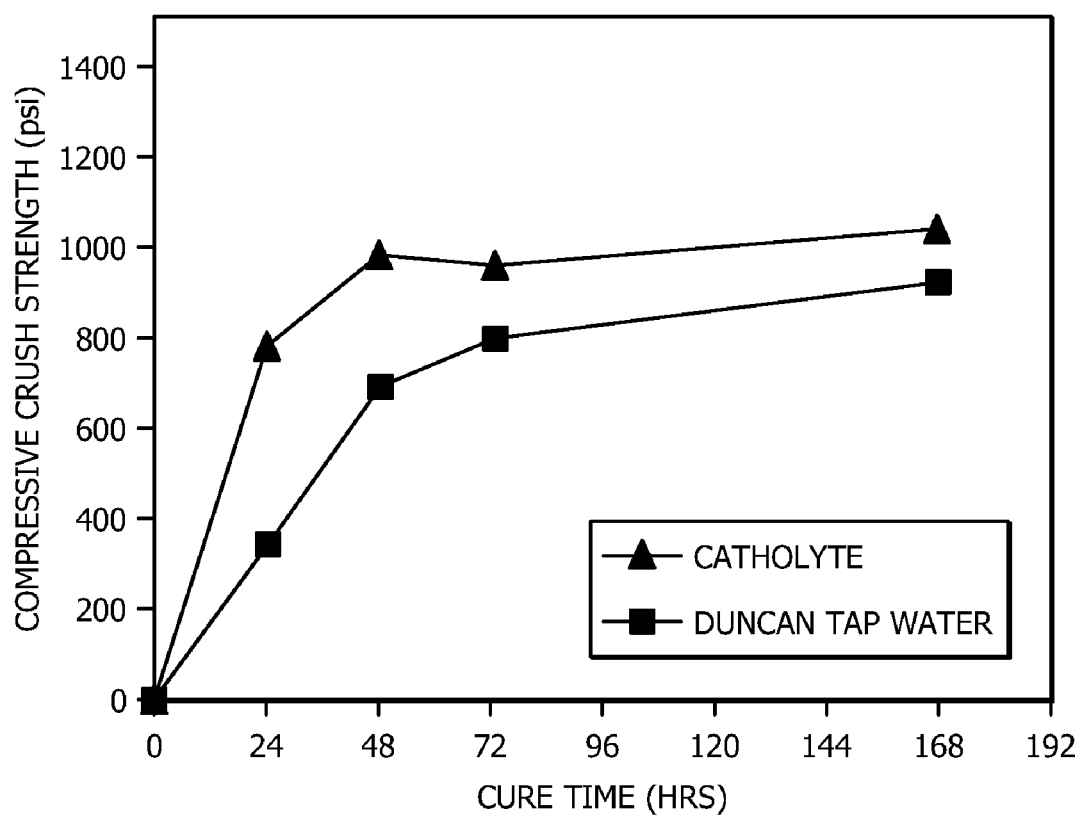
FIG. 6 is a plot of compressive strength as a function of cure time for a lightweight pozzolana cement slurry cured at 150° F.

The effect of catholyte on the compressive strength of cement slurries comprising lightweight pozzolana cement was evaluated at room temperature and 150° F. Pozzolana cements are prepared from materials which, although they do not have cementing properties in themselves, will combine chemically with Portland cement in the presence of water to form strong a cement mixture. Pozzolana materials include fly ash, burnt clays, ash from burnt plant material, and silicious earths. At each temperature, Sample 1 was obtained by mixing cement with catholyte, and Sample 2 was obtained by mixing cement with DTW. The compressive crush strength measured in psi was measured after 24, 48, 72, and 168 hours after mixing. The results at room temperature and 150° F. are shown in Table 3 and FIGS. 5 and 6 respectively.

TABLE 3

| Time (hours) | Temperature | Sample 1-Catholyte | Sample 2-DTW | % Strength Increase |
|---|---|---|---|---|
| 0 | RT | 0 | 0 | — |
| 24 | RT | 34 | 13 | 162 |
| 48 | RT | 103 | 53 | 94 |
| 72 | RT | 178 | 73 | 144 |
| 168 | RT | 490 | 115 | 326 |
| 0 | 150° F. | 0 | 0 | — |
| 24 | 150° F. | 792 | 350 | 126 |
| 48 | 150° F. | 983 | 686 | 43 |
| 72 | 150° F. | 956 | 800 | 20 |
| 168 | 150° F. | 1018 | 897 | 13 |

In each of the preceding examples, cement slurries prepared using catholyte developed a greater compressive strength than slurries prepared with either DTW or caustic water.

Proof-of-concept laboratory results show compressive strength increases (compared to a baseline) of 12% up to 326% depending on temperature, cure time, and type of cement. A significant advantage may be found in lightweight cementing applications. Strengths of cement are often limited due to the lightweight components in the formulation; with electrochemically modified water, this can boost both the early and late strengths of the lightweight slurry to exceed customer and regulation (such as the Texas Railroad Commission) strengths requirements.

While embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A wellbore servicing method comprising:
   converting a water into an electrochemically activated water;
   preparing a wellbore servicing composition comprising the electrochemically activated water, wherein the water is separately converted into the electrochemically activated water and thereafter used in preparing the wellbore servicing composition, and wherein the electrochemically activated water has an oxidation reduction potential from about −600 mV to about −900 mV prior to being used in preparing the wellbore servicing composition; and
   placing the wellbore servicing composition in a wellbore.

2. The wellbore servicing method of claim 1 wherein the electrochemically activated water is a catholyte.

3. The wellbore servicing method of claim 1 wherein the electrochemically activated water is an antioxidant.

4. The wellbore servicing method of claim 1 wherein the electrochemically activated water has a negative ionic potential.

5. The wellbore servicing method of claim 1 wherein the electrochemically activated water has a pH from about 10 to about 12 prior to being used in preparing the wellbore servicing composition.

6. The wellbore servicing method of claim 1 wherein the wellbore servicing composition comprises drilling fluids, spacer fluids, fracturing fluids, workover fluids, completion fluids, or combinations thereof.

7. The wellbore servicing method of claim 1 wherein the wellbore servicing composition comprises a cement.

8. The wellbore servicing method of claim 7 wherein the cement comprises a hydraulic cement.

9. The wellbore servicing method of claim 7 wherein the cement comprises calcium, aluminum, silicon, oxygen, sulfur, or combinations thereof.

10. The wellbore servicing method of claim 9 wherein the hydraulic cement comprises Portland cement, pozzolana cement, gypsum cement, shale cement, acid/base cement, phosphate cement, high alumina content cement, silica cement, high alkalinity cement, magnesia cement, or combinations thereof.

11. The wellbore servicing method of claim 7 wherein the cement further comprises an additive.

12. The wellbore servicing method of claim 11 wherein the additive comprises salts, accelerants, set retarders, foamers, defoamers, fluid loss agents, weighting materials, dispersants, vitrified shale, density-reducing additives, hollow glass beads, foam, formation conditioning agents, lost circulation materials, thixotropic agents, suspension aids, mechanical property modifying additives, carbon fibers, glass fibers, metal fibers, minerals fibers, polymeric elastomers, latexes, expanding additives, gas, fluid absorbing materials, resins, aqueous superabsorbers, non-aqueous superabsorbers, viscosifying agents, suspending agents, dispersing agents, inert particulates, or combinations thereof.

13. The wellbore servicing method of claim 7 wherein the electrochemically activated water has a pH from about 10 to about 12.

14. The wellbore servicing method of claim 7 wherein the converting comprises:
    passing the water through an electrolytic cell comprising an anode compartment and a cathode compartment; and
    wherein the electrochemically activated water comprises the water discharged from the cathode compartment.

15. The wellbore servicing method of claim 1 further comprising:
    setting the wellbore servicing composition to generate a hardened wellbore servicing composition.

16. The wellbore servicing method of claim 15 wherein the hardened wellbore servicing composition has a compressive strength of at least 10% greater than an otherwise similar hardened wellbore servicing composition lacking the electrochemically activated water.

17. The wellbore servicing method of claim 15 wherein the hardened wellbore servicing composition has a density from about 4 pounds per gallon to about 23 pounds per gallon.

18. The wellbore servicing method of claim 1 wherein the converting comprises electrolytical modification or electrochemical activation.

19. The wellbore servicing method of claim 1 wherein the converting comprises:
    passing the water through an electrolytic cell comprising an anode compartment and a cathode compartment; and
    wherein the electrochemically activated water comprises the water discharged from the cathode compartment.

20. The wellbore servicing method of claim 1, wherein converting a water into an electrochemically activated water comprises:
    combining the water with an aqueous fluid comprising a salt to form a first fluid; and
    converting the first fluid into the electrochemically activated water.

* * * * *